US012810089B2

(12) United States Patent
Astvatsaturov et al.

(10) Patent No.: US 12,810,089 B2
(45) Date of Patent: *Nov. 24, 2026

(54) BI-OPTIC INDICIA READERS AND PLATTERS FOR USE THEREWITH HAVING OPTICAL REDIRECTION ELEMENT(S) WITHIN THE PLATTER

(71) Applicant: Zebra Technologies Corporation, Lincolnshire, IL (US)

(72) Inventors: Yuri Astvatsaturov, Lake Forest, IL (US); Darran Michael Handshaw, Sound Beach, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/296,845

(22) Filed: Aug. 11, 2025

(65) Prior Publication Data

US 2025/0363319 A1 Nov. 27, 2025

Related U.S. Application Data

(63) Continuation of application No. 18/204,310, filed on May 31, 2023, now Pat. No. 12,387,071.

(51) Int. Cl.
*G06K 7/10* (2006.01)

(52) U.S. Cl.
CPC ....... *G06K 7/10831* (2013.01); *G06K 7/1096* (2013.01)

(58) Field of Classification Search
CPC ......................... G06K 7/1096; G06K 7/10831
USPC .................................... 235/383, 462.14, 454
See application file for complete search history.

(56) References Cited

U.S. PATENT DOCUMENTS

| | | | | |
|---|---|---|---|---|
| 12,387,071 | B2 * | 8/2025 | Astvatsaturov | G06K 7/1096 |
| 2010/0282850 | A1 * | 11/2010 | Olmstead | G06K 7/10722<br>235/440 |
| 2021/0150162 | A1 * | 5/2021 | Barkan | G06K 7/1413 |
| 2022/0076545 | A1 * | 3/2022 | Barkan | G06Q 20/4014 |
| 2024/0037358 | A1 * | 2/2024 | Barkan | G06K 7/10722 |
| 2025/0045544 | A1 * | 2/2025 | Barkan | G06K 7/1096 |

* cited by examiner

*Primary Examiner* — Suezu Ellis

(57) ABSTRACT

Imaging systems for imaging or scanning objects by redirecting portions of a field of view (FOV) are described herein. An example imaging system includes: an imaging assembly; a platter including a redirection element; and a computer-readable media storing machine readable instructions that cause the imaging system to: capture the image data in the FOV, wherein a first subset of pixels captures a first subset of the image data associated with a first portion of the FOV not redirected by the redirection element, and a second subset of pixels captures a second subset of the image data associated with a redirected portion of the FOV redirected by the redirection element; process the first subset of image data via a first module to perform a first vision operation; and process the second subset of image data via a second module to perform a second vision operation.

11 Claims, 11 Drawing Sheets

BI-OPTIC INDICIA READERS AND PLATTERS FOR USE THEREWITH HAVING OPTICAL REDIRECTION ELEMENT(S) WITHIN THE PLATTER

CROSS-REFERENCE TO RELATED APPLICATIONS

The present disclosure is a continuation of U.S. patent application Ser. No. 18/204,310, filed on May 31, 2023, and incorporated herein by reference in its entirety.

BACKGROUND

Barcode reading systems have long been used for a variety of purposes, such as to capture barcode data, which is then used to look up the price of the item read, and for machine vision purposes. Such purposes may require a user to pass an object over a particular field of view (FOV) in order to perform the operation in question. However, the FOV may not fully cover the area in which a user would potentially move the object. As such, a user may sometimes—whether by accident or by design—move an object such that the barcode reading system is unable to successfully capture an image of the object and properly perform an operation on such. This may cause frustration for a user or may cause the barcode reading system to miss malicious actions by a bad-faith actor.

Existing attempts to solve such a problem require large modifications to barcode reading systems, leading to systems with increased footprint, increased power usage, and/or increased resource costs. As such, attempts to solve the problem have so far been less than successful. Therefore, systems and methods for expanding a FOV without increasing the power usage and complexity of existing barcode reading systems is desirable.

SUMMARY

In an embodiment, an imaging system for redirecting and/or repurposing portions of a field of view (FOV) is provided. The imaging system includes: (1) an imaging assembly configured to capture image data of an environment appearing in a field of view (FOV); (2) a platter including a redirection element disposed with a path of a portion of the FOV such that the redirection element redirects the portion of the FOV to pass through the platter to an outer portion of the platter; and (3) a computer-readable media storing machine readable instructions that, when executed, cause the imaging system to: (a) capture, via the imaging assembly, the image data of the environment appearing in the FOV, wherein a first subset of pixels captures a first subset of the image data associated with a first portion of the FOV that is not redirected by the redirection element and a second subset of pixels captures a second subset of the image data associated with a redirected portion of the FOV that is redirected by the redirection element; (b) process the first subset of image data via a first pipeline (e.g., a module) to perform a first vision operation, wherein the first vision operation includes at least one of: (i) transmitting the image data to a decoder for a decode operation or (ii) transmitting the image data to a vision analysis module for one or more machine vision operations; and (c) process the second subset of image data via a second pipeline to perform a second vision operation, wherein the second pipeline is different from the first pipeline.

In a variation of the embodiment, the second vision operation is a different operation than the first vision operation.

In another variation of the embodiment, the second vision operation relates to at least one of: (i) a wakeup operation, (ii) a scan avoidance operation, (iii) an object detection operation, or (iv) an off-platter detection operation.

In a further variation of the embodiment, the second vision operation relates to the scan avoidance operation, and performing the scan avoidance operation includes: detecting an object in the redirected portion of the FOV; determining that the object is not visible in the first portion of the FOV; and in response, determining that a user is attempting to avoid a scan for the object.

In still yet another variation of the embodiment, the redirection element is a first redirection element, and the imaging system further comprises: an illumination system configured to project light that illuminates at least an illuminated portion of the FOV; and the platter includes a second redirection element disposed within a path of the illuminated portion of the FOV such that the second redirection element redirects a portion of the light to pass through the platter.

In a further variation of the embodiment, the second redirection element illuminates the redirected portion of the FOV by redirecting the portion of the light to the outer portion of the FOV.

In another further variation of the embodiment, the imaging system includes a photodetector disposed to receive the portion of the light from the second redirection element, and the computer-readable media further stores additional instructions that, when executed, cause the imaging system to: determine that an object is present when the photodetector does not detect light.

In yet another further variation of the embodiment, the second redirection element redirects the portion of the light to a first corner of the outer area, the redirected portion of the FOV includes a second corner of the outer area, and the computer-readable media further stores additional instructions that, when executed, cause the imaging system to: detect whether an object is overhanging an edge of the platter connecting the first corner and the second corner by determining whether the illumination is obscured; and in response, determine whether an off-platter event is occurring based on whether the illumination is obscured.

In another variation of the embodiment, the imaging system further comprises: an illumination system configured to project light that illuminates at least an illuminated portion of the FOV; and wherein the redirection element is further disposed within a path of the illuminated portion of the FOV such that the redirection element illuminates the redirected portion of the FOV by redirecting a portion of the light to pass through the platter.

In yet another variation of the embodiment, the redirection element is a first redirection element, the redirected portion is a first redirected portion, the outer portion is a first outer portion, and the platter further comprises: a second redirection element disposed within a path of a second portion of the FOV, such that the second redirection element redirects the second portion of the FOV to pass through the platter to a second portion of the platter; wherein the computer-readable media further stores additional instructions that, when executed, cause the imaging system to: capture, via a third subset of pixels, a third subset of the image data associated with a second redirected portion of the FOV that is redirected by the second redirection element;

and process the third subset of image data via a third pipeline to perform a third vision operation.

In still yet another variation of the embodiment, the redirection element includes a lightpipe (also referred to herein as a "light pipe") with a total internal reflection (TIR) surface.

In another variation of the embodiment, the redirection element includes one or more optical fibers for directing light.

In yet another variation of the embodiment, the redirection element includes one or more mirrors for reflecting light.

In still yet another variation of the embodiment, the computer-readable media further stores additional instructions that, when executed, cause the imaging system to: operate in a slit frame mode such that the imaging system monitors a subset of the plurality of pixels for an indication to perform a wakeup operation; wherein the at least some of the plurality of pixels include at least some of the subset of the plurality of pixels.

In another variation of the embodiment, the computer-readable media further stores additional instructions that, when executed, cause the imaging system to: increase a frame rate of the at least some of the subset of the plurality of pixels.

In still yet another variation of the embodiment, the redirection element redirects the redirected portion of the FOV by redirecting the portion of the FOV to the outer portion such that the redirected portion of the FOV aligns with an outside edge of the platter and is directed upwards from the platter.

In another embodiment, a method for redirecting and/or repurposing portions of a field of view (FOV) is provided. The method includes: (a) capturing, by one or more processors via a plurality of pixels, image data of an environment appearing in a field of view (FOV) of an imaging assembly, wherein (i) a first subset of pixels of the plurality of pixels captures a first subset of the image data associated with a first portion of the FOV, and (ii) a second subset of pixels of the plurality of pixels captures a second subset of the image data associated with a redirected portion of the FOV that is redirected by a redirection element, the redirection element disposed within a path of a portion of the FOV such that the redirection element redirects the redirected portion of the FOV and does not redirect the first portion of the FOV; (b) processing, by the one or more processors, the first subset of image data via a first pipeline to perform a first vision operation, wherein the first vision operation includes at least one of: (i) transmitting the image data to a decoder for a decode operation, or (ii) transmitting the image data to a vision analysis module for one or more machine vision operations; and (c) processing, by the one or more processors, the second subset of image data via a second pipeline to perform a second vision operation, wherein the second pipeline is different from the first pipeline.

In a variation of the embodiment, the second vision operation is a different operation than the first vision operation.

In another variation of the embodiment, the second vision operation relates to at least one of: (i) a wakeup operation, (ii) a scan avoidance operation, (iii) an object detection operation, or (iv) an off-platter detection operation.

In a further variation of the embodiment, the second vision operation relates to the scan avoidance operation, and performing the scan avoidance operation includes: detecting an object in the redirected portion of the FOV; determining that the object is not visible in the first portion of the FOV; and in response, determining that a user is attempting to avoid a scan for the object.

In yet another variation of the embodiment, the redirection element is a first redirection element, and the method further comprises: illuminating, via an illumination system, at least an illuminated portion of the FOV; and redirecting, via a second redirection element of the platter disposed within a path of the illuminated portion of the FOV, a portion of light emitted by the illumination system to pass through the platter.

In a further variation of the embodiment, the method further comprises: illuminating, via the second redirection element, the redirected FOV by redirecting the portion of the light to the outer portion of the FOV.

In another further variation of the embodiment, the method further comprises: determining that an object is present when a photodetector disposed to receive the portion of the light from the second redirection element does not detect light.

In yet another further variation of the embodiment, the second redirection element redirects the portion of the light to a first corner of the outer area, the redirected portion of the FOV includes a second corner of the outer area, and the method further comprises: detecting whether an object is overhanging an edge of the platter connecting the first corner and the second corner by determining whether the illumination is obscured; and in response, determining whether an off-platter event is occurring based on whether the illumination is obscured.

In another variation of the embodiment, the method further comprises: illuminating, via an illumination system, at least an illuminated portion of the FOV; and illuminating, via the redirection element, the redirected portion of the FOV by redirecting a portion of the light to the outer portion of the FOV.

In yet another variation of the embodiment, the redirection element is a first redirection element, the redirected portion is a first redirected portion, the outer portion is a first outer portion, and the method further comprises: capturing, via a third subset of pixels, a third subset of image data associated with a second redirected portion of the FOV that is redirected by a second redirection element, the redirection element disposed within a path of a second portion of the FOV such that the second redirection element redirects the second portion of the FOV to pass through the platter to a second outer portion of the platter; and processing the third subset of image data to perform a third vision operation.

In still yet another variation of the embodiment, the redirection element includes a lightpipe with a total internal reflection (TIR) surface.

In another variation of the embodiment, the redirection element includes one or more optical fibers for directing light.

In yet another variation of the embodiment, the redirection element includes one or more mirrors for reflecting light.

In still yet another variation of the embodiment, the method further comprises: operating in a slit frame mode such that the imaging system monitors a subset of the plurality of pixels for an indication to perform a wakeup operation; wherein the at least some of the plurality of pixels include at least some of the subset of the plurality of pixels.

In another variation of the embodiment, the method further comprises: increasing a frame rate of the at least some of the subset of the plurality of pixels.

In yet another variation of the embodiment, the redirection element redirects the redirected portion of the FOV by redirecting the portion of the FOV to the outer portion such that the redirected portion of the FOV aligns with an outside edge of the platter and is directed upwards from the platter.

In another embodiment, a platter for use with a bi-optic barcode reader is provided. The platter includes: a substantially planar surface configured to face a product scanning region of the bi-optic reader when the platter is installed in the bi-optic reader; a transparent window positioned within the substantially planar surface; and an optical redirection element, wherein, when the platter is installed in the bi-optic reader, the optical redirection element is positioned within a path of a FOV such that a first portion of the FOV passes through the window and a second portion of the FOV is redirected, by the optical redirection element, away from the first portion of the FOV.

In a variation of this embodiment, the FOV is at least one of an imaging FOV or an illumination FOV.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1A:
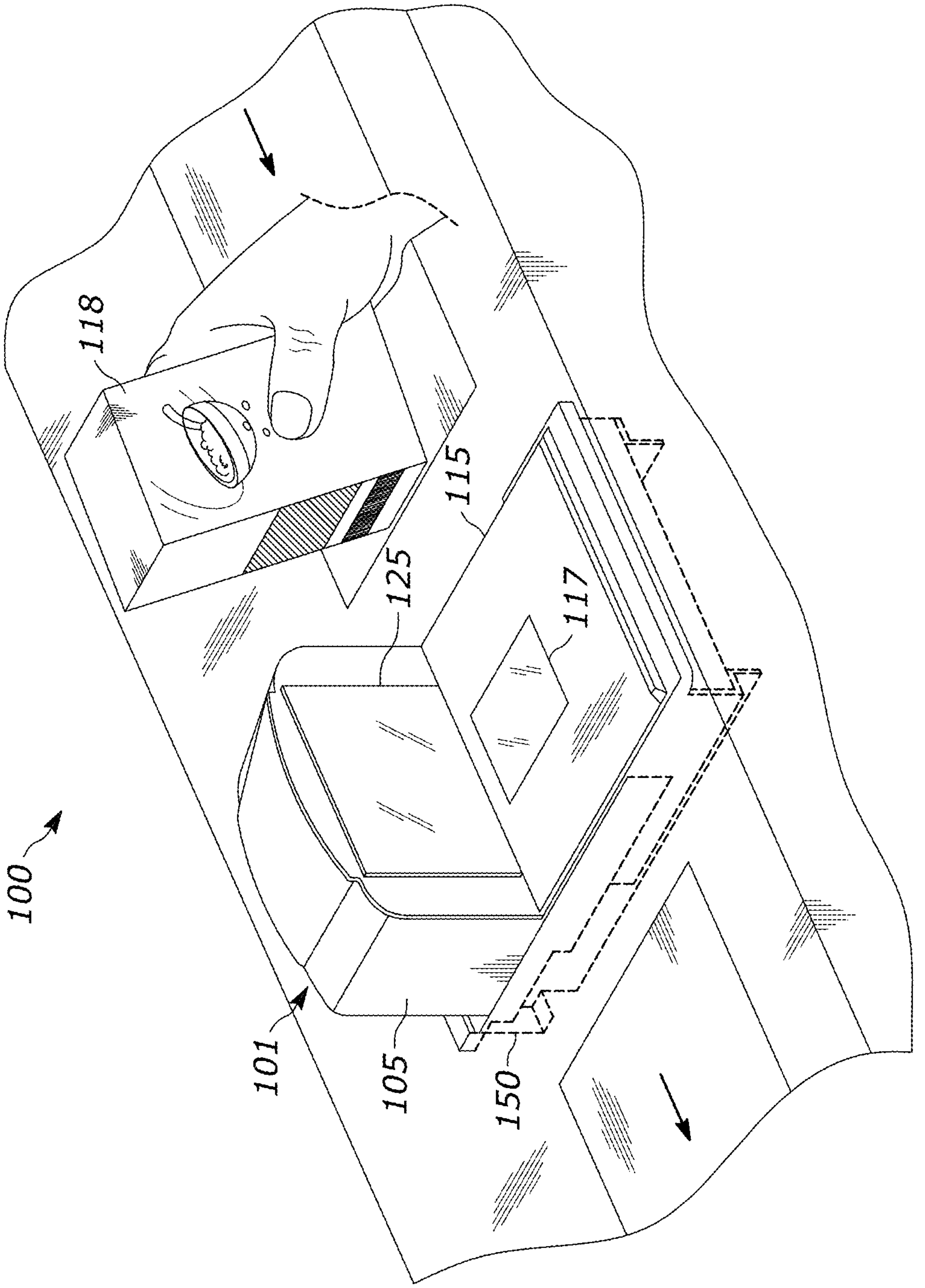
FIG. 1A illustrates a perspective view of a first example bi-optic barcode reader.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Traditional barcode readers, bi-optic barcode readers, and other such imaging devices detect objects passing through a field of view (FOV) associated with sensors for the device. However, relying solely on the FOVs associated with sensors for the device allows accidents, malicious actions by bad-faith actors, and other such actions to block, obfuscate, or otherwise impact the vision operations performed by the device. For example, a user may move an object across a device while remaining out of the FOV associated with the sensors, allowing the user to appear to outside observers as though a proper scan occurs. As such, traditional techniques fail to address a concern in performing decode events and other such machine vision operations on an object.

Moreover, a number of traditional techniques designed to detect such actions add further problems. In particular, traditional systems have attempted to solve the problems noted above by introducing additional sensors. For example, existing attempts to solve the problem(s) detailed herein may require additional sensors with additional FOVs, such as infrared sensors, to attempt to detect objects as described above. Such attempts, however, add additional sensors and systems, increasing the power consumption, resource usage, footprint, and complexity of the system. Accordingly, there is a need for solutions that solve issues regarding objects moving outside of a standard FOV for a device.

For example, an imaging system may include an imaging assembly configured to capture image data of an environment appearing in a FOV and a platter including a redirection element disposed such that the redirection element redirects a portion of the FOV to pass through the platter (e.g., to an outside or otherwise difficult to see portion of the platter). As such, the imaging system may perform a first vision operation using the main portion of the FOV (e.g., the portion of the FOV that would normally be used in a standard system) while using the redirected portion of the FOV to perform a second vision operation.

Moreover, an imaging system may use the redirection element to redirect illumination (e.g., to illuminate the redirected portion of the FOV). Additionally or alternatively, the imaging system may use additional redirection elements to redirect other portions of the FOV or the illumination to better perform various vision operations.

Other benefits may be realized from incorporating a system implementing the instant techniques. For example, the imaging device of the present application may be smaller, cheaper, and/or less energy intensive due to the obviation of a need for multiple additional sensors and/or other visioning systems.

It will be understood that, although various embodiments may refer to one or more elements, fewer, more, or alternate versions may similarly apply. Similarly, the disclosure herein may refer to a category of element (e.g., redirection elements 302A, 302B, etc.) by a single identifier (e.g., redirection element 302) for the sake of ease of understanding.

Referring first to FIGS. 1A-1H, an example bi-optic barcode reader 100 is shown that includes a housing assembly 101 with an upper housing 105 and a lower housing 150, which together define an interior region 165 of bi-optic barcode reader 100. Lower housing 150 is secured directly to upper housing 105, for example with threaded members, without any intermediate housing portion positioned between upper housing 105 and lower housing 150. A seal can be positioned between upper housing 105 and lower housing 150, which can minimize electrostatic discharge and dust, and liquid from entering interior region 165.

Figure 1B:
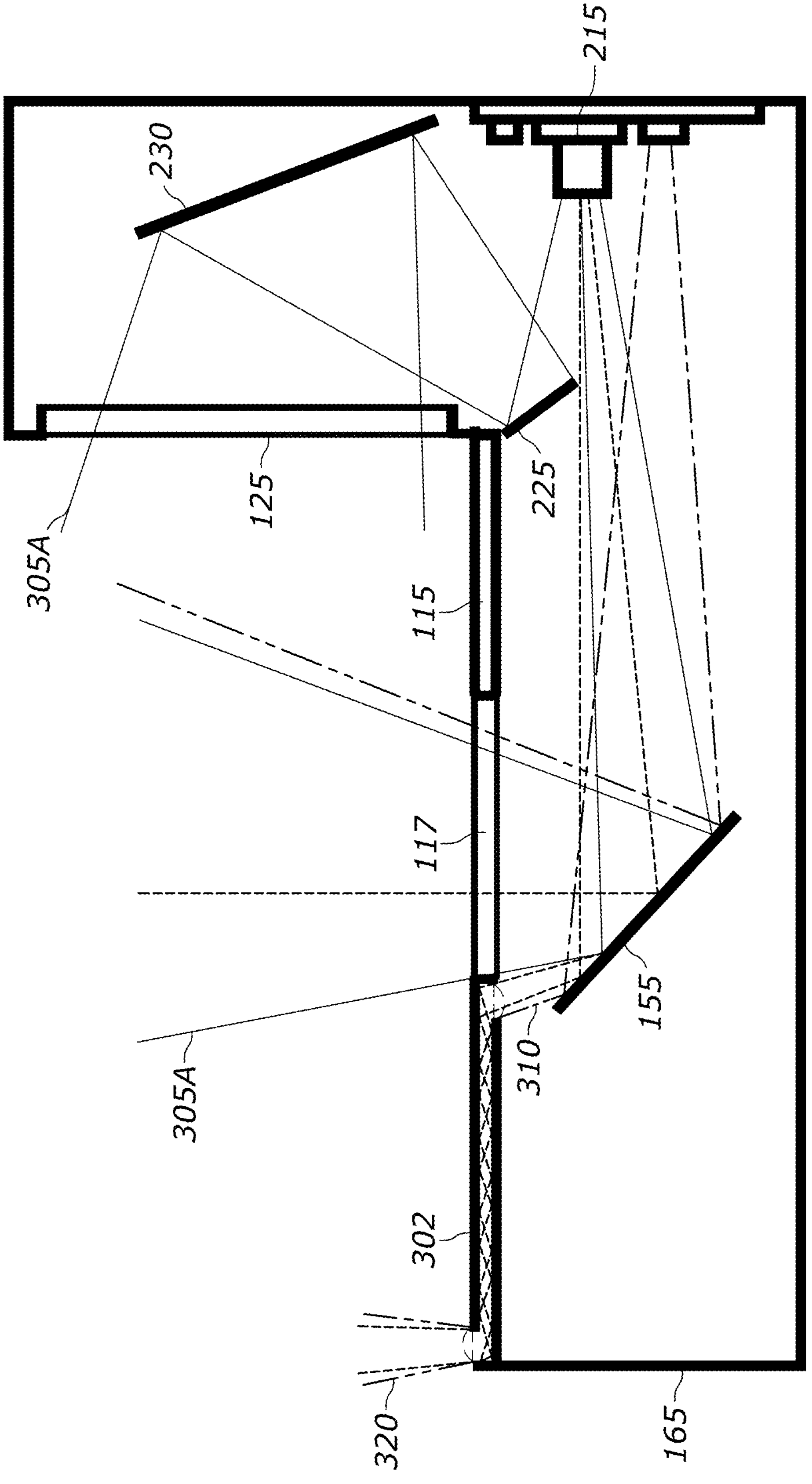
FIGS. 1B and 1C illustrate side views of different example embodiments of the bi-optic barcode reader of FIG. 1A redirecting fields-of-view (FOVs) via a redirection element.
Figure 1C:
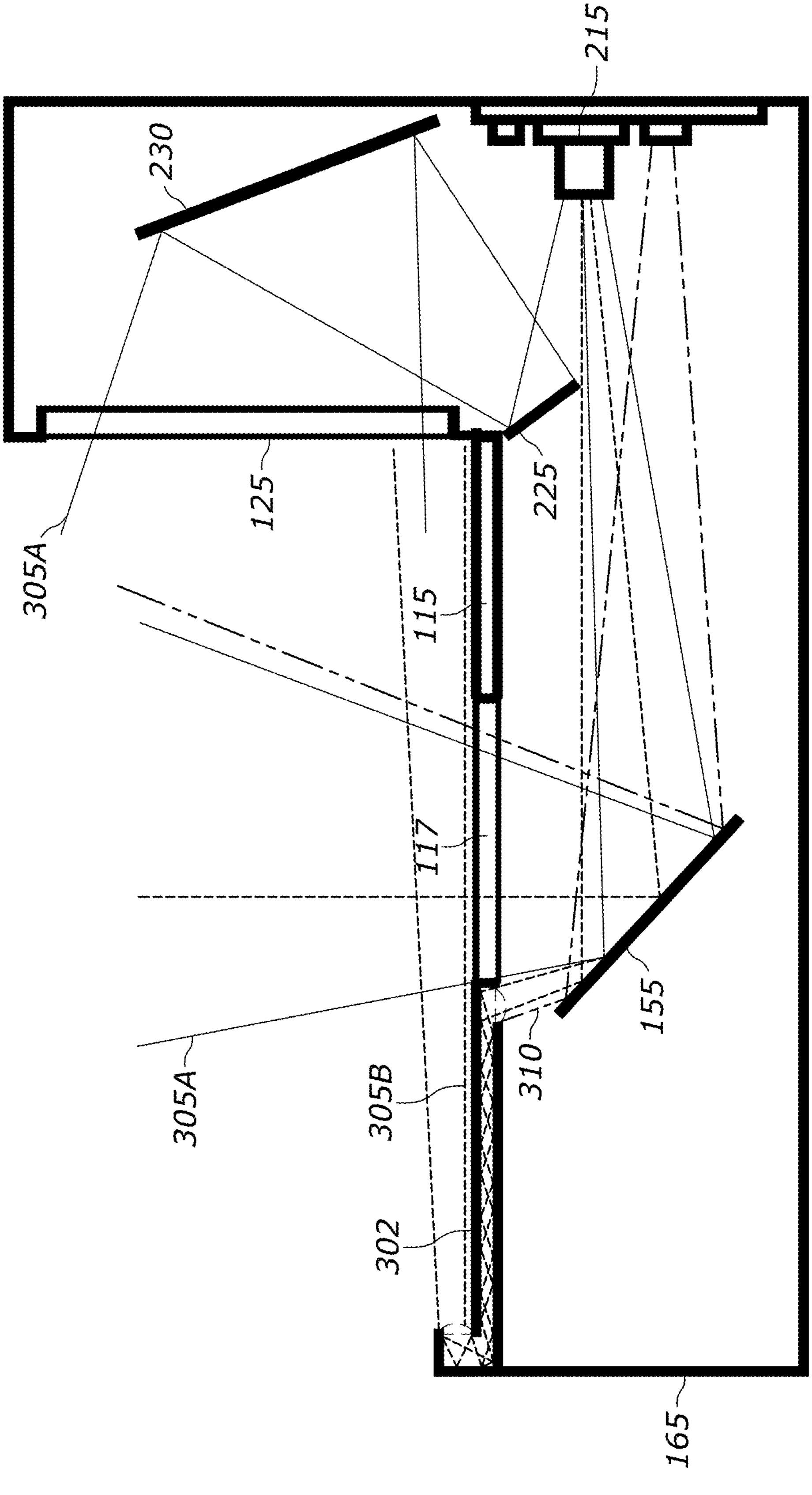

As can be seen in FIGS. 1B and 1C, bi-optic barcode reader 100 can include various optical and electronic components, such as a monochromatic imaging sensor 215, at least one intermediate mirror 225, at least one vertical output mirror 230, and at least one horizontal output mirror 155 positioned in interior region 165. Similarly, the bi-optic barcode reader 100 includes a redirection element 302 that receives a portion of a field-of-view (FOV) of an imaging sensor 215 and redirections the portion to a redirected portion 320 of the FOV. In particular, with this arrangement of components, intermediate mirror 225 is a splitter mirror and a field-of-view of imaging sensor 215 is split by intermediate mirror 225 into a first portion and a second portion, with the first portion being directed out of generally horizontal window 117 of a platter 115 by horizontal output mirror 155 and the second portion being directed out of generally upright window 125 by vertical output mirror 230. In further implementations, the horizontal window 117 may be separate from the platter 115. Further, the redirection element 302 may be disposed such that at least a portion of the FOV is redirected to become a redirected FOV, such as redirection portion 320 or redirected portion 305B, as described in more detail below. The redirected FOV may be vertical or lateral, depending on the implementation, as depicted in FIG. 1B and FIG. 1C, respectively.

In further implementations, the bi-optic barcode reader 100 may also include an illumination light source (e.g., illumination light source 251 as described below with regard to FIG. 2), which emits light towards an object 118 through the horizontal window 117 of the platter 115 or the generally upright window 125.

As shown in the examples of FIGS. 1B and 1C, intermediate mirror 225 is a concave splitter mirror that directs one part of the second portion to a first vertical output mirror 230 and a second part of the second portion to a second vertical output mirror 230. Alternatively, intermediate mirror 225 could also be a convex splitter mirror that directs the second portion to two vertical output mirrors 230 or intermediate mirror 225 could be a planar splitter mirror that directs the entire second portion to a single vertical output mirror 230. In addition, in some implementations, the bi-optic barcode reader 100 has a color imaging sensor 235, where a first field-of-view 220 of monochromatic imaging sensor 215 is directed out of the generally horizontal window 117 of the platter 115 by horizontal output mirror 155 and a second field-of-view 240 of color imaging sensor 235 is directed out of generally upright window 125 by vertical output mirror 230.

Figure 1D:
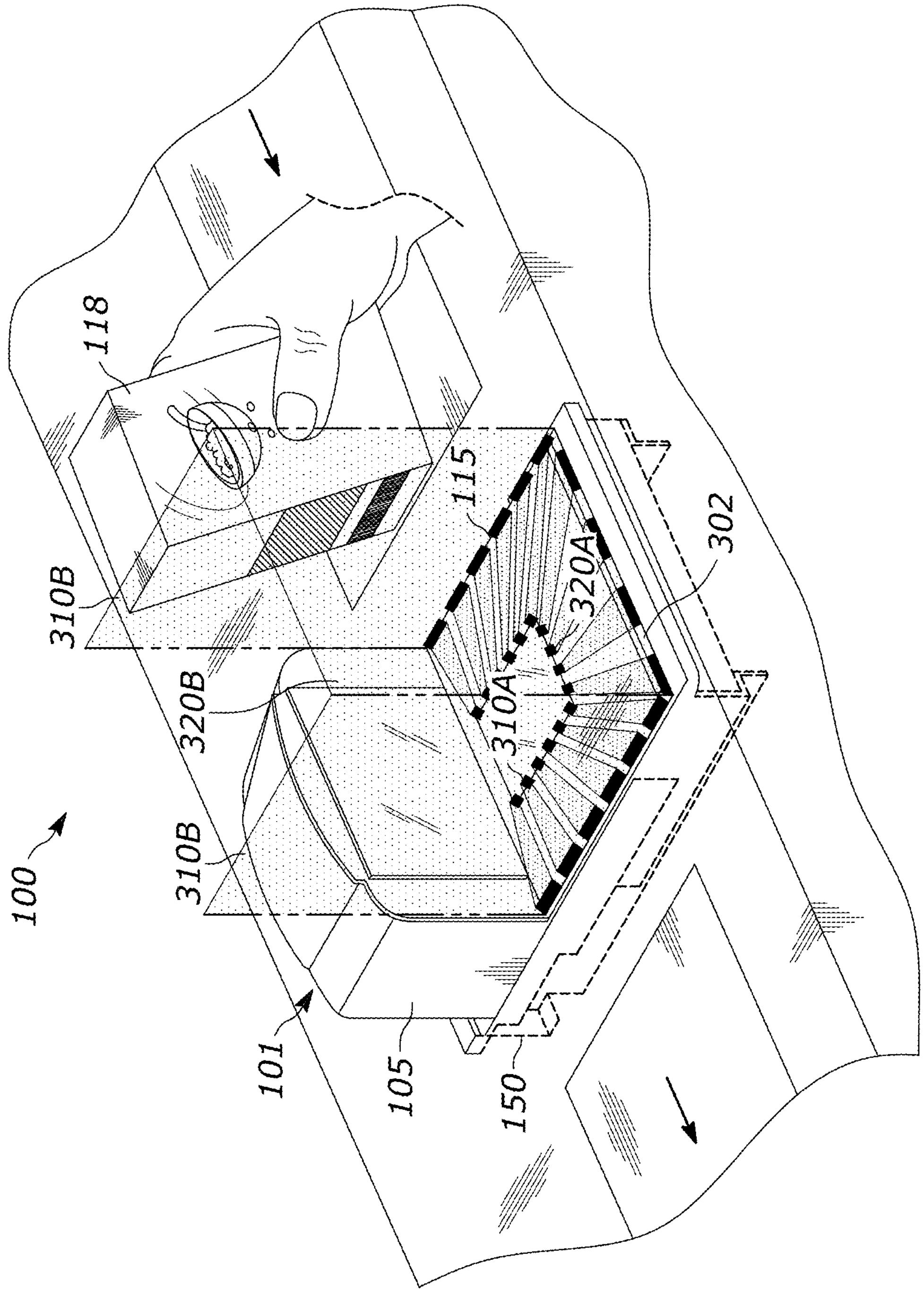
FIGS. 1D-1G illustrate perspective views of different example embodiments for redirecting the FOVs of the bi-optic barcode reader of FIG. 1A.

As described above, the bi-optic barcode reader 100 also includes a redirection element 302. The redirection element 302 redirects portions of a captured FOV such that the bi-optic barcode reader 100 is able to use the redirected FOV to maintain a view of areas that would normally be beyond or otherwise absent from the standard FOV. As shown in the examples of FIGS. 1D-1G, the bi-optic barcode reader 100 may redirect some of the FOV (e.g., FOV 305A of FIG. 1B) by way of a redirection element 302 in multiple different ways. For example, in the embodiment of FIG. 1D, the redirection element 302 redirects the FOV such that side portions 310A of the FOV are redirected to become side-facing vision curtains of redirected portions 310B and a user-facing initial portion 320A of the FOV is redirected to become a user-facing vision curtain as redirected portion 320B. Although FIG. 1D depicts multiple redirection elements 302 per side, it will be understood that fewer, more, or different redirection elements may be used instead. For example, the redirection element may include a dispersing lens to broaden the redirected FOV.

Figure 1E:
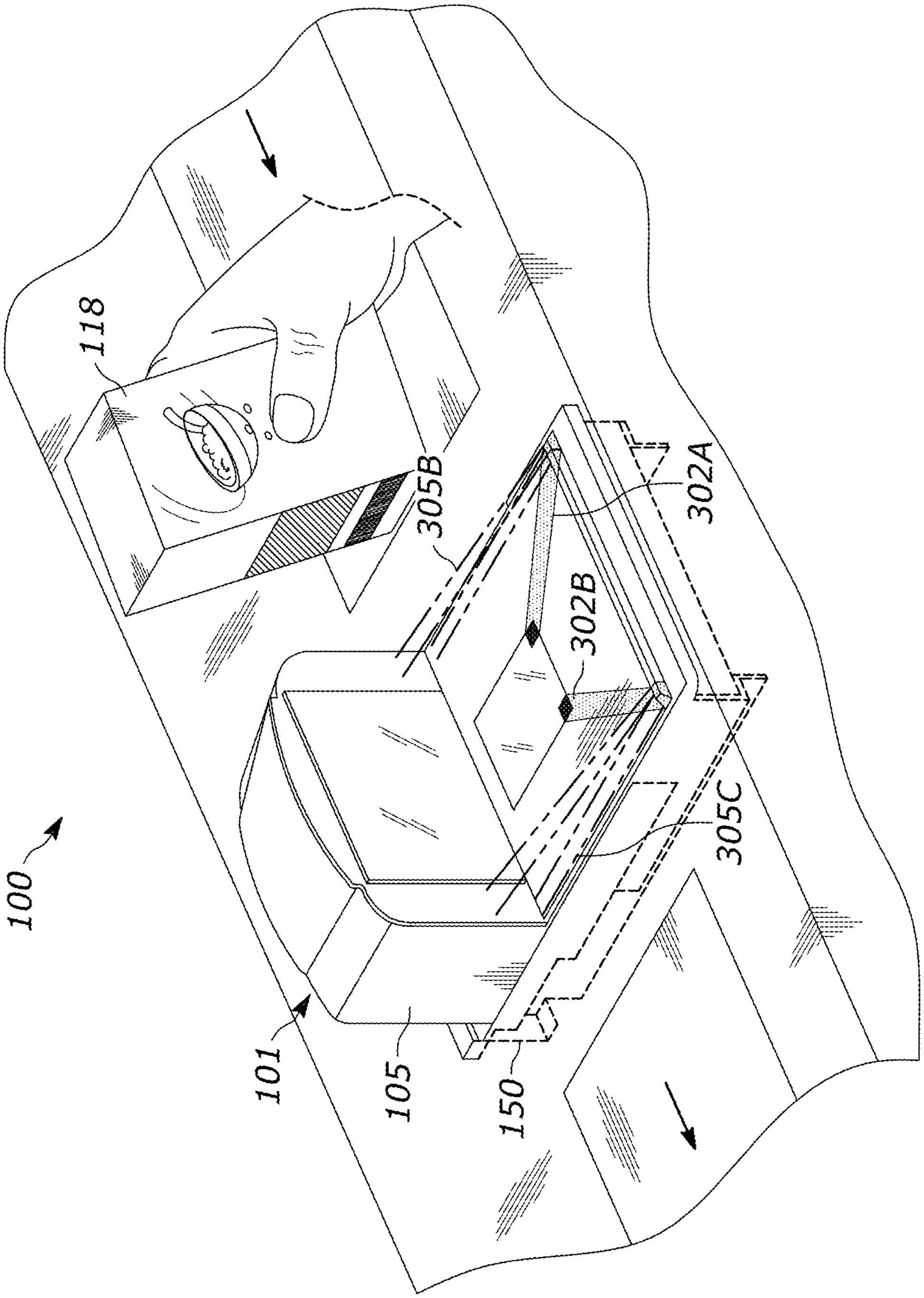
Figure 1F:
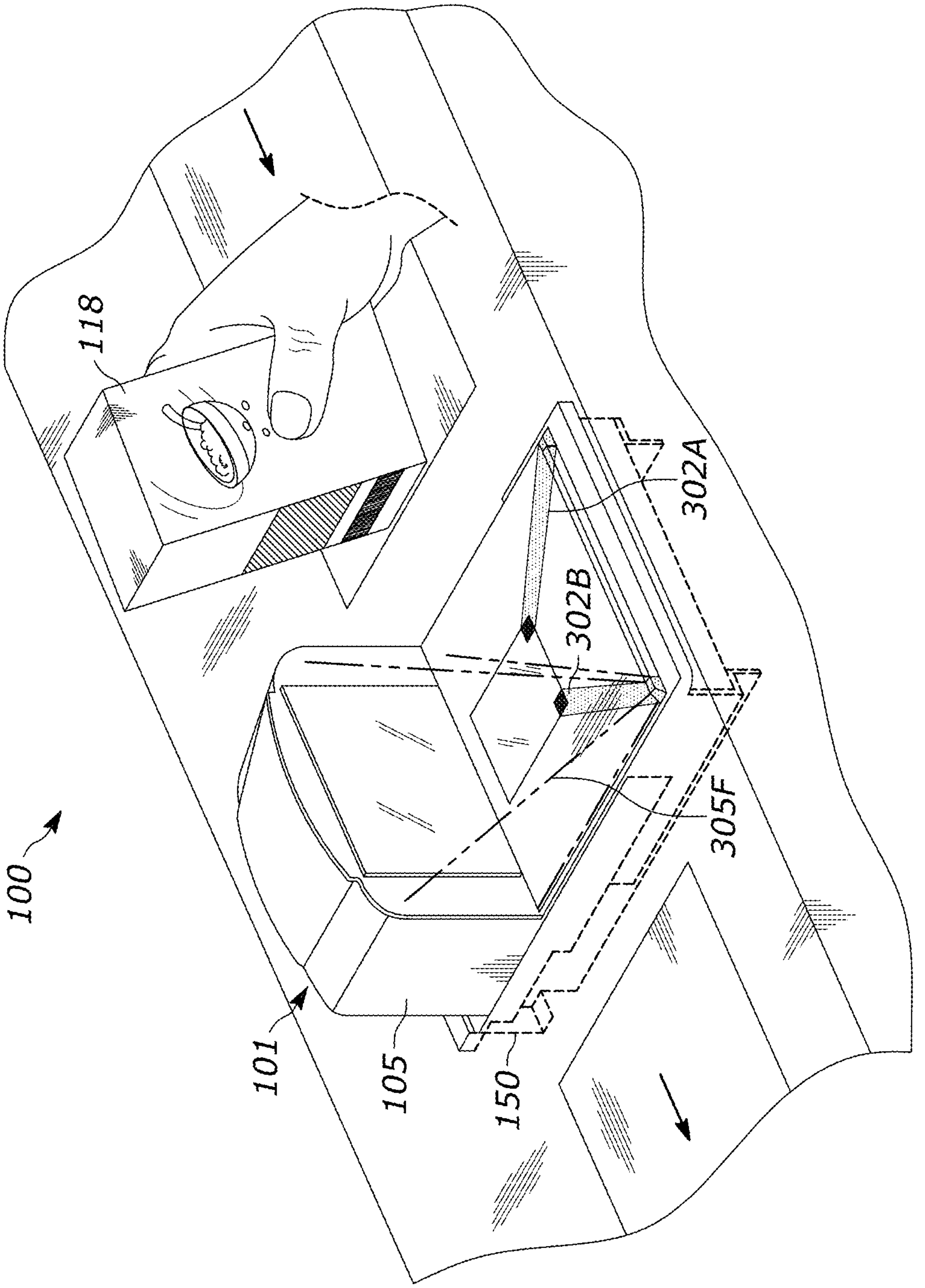
Figure 1G:
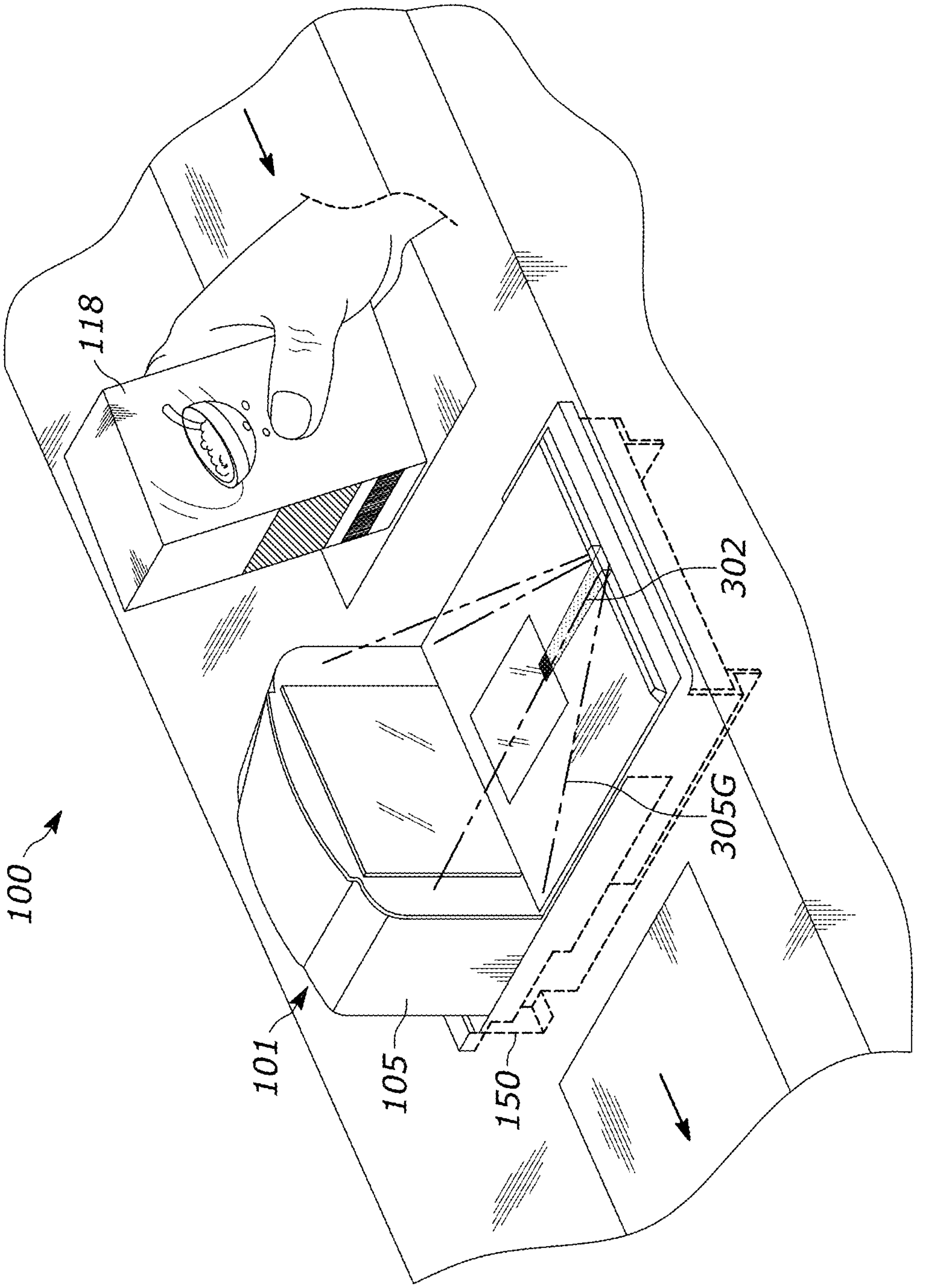
Figure 1H:
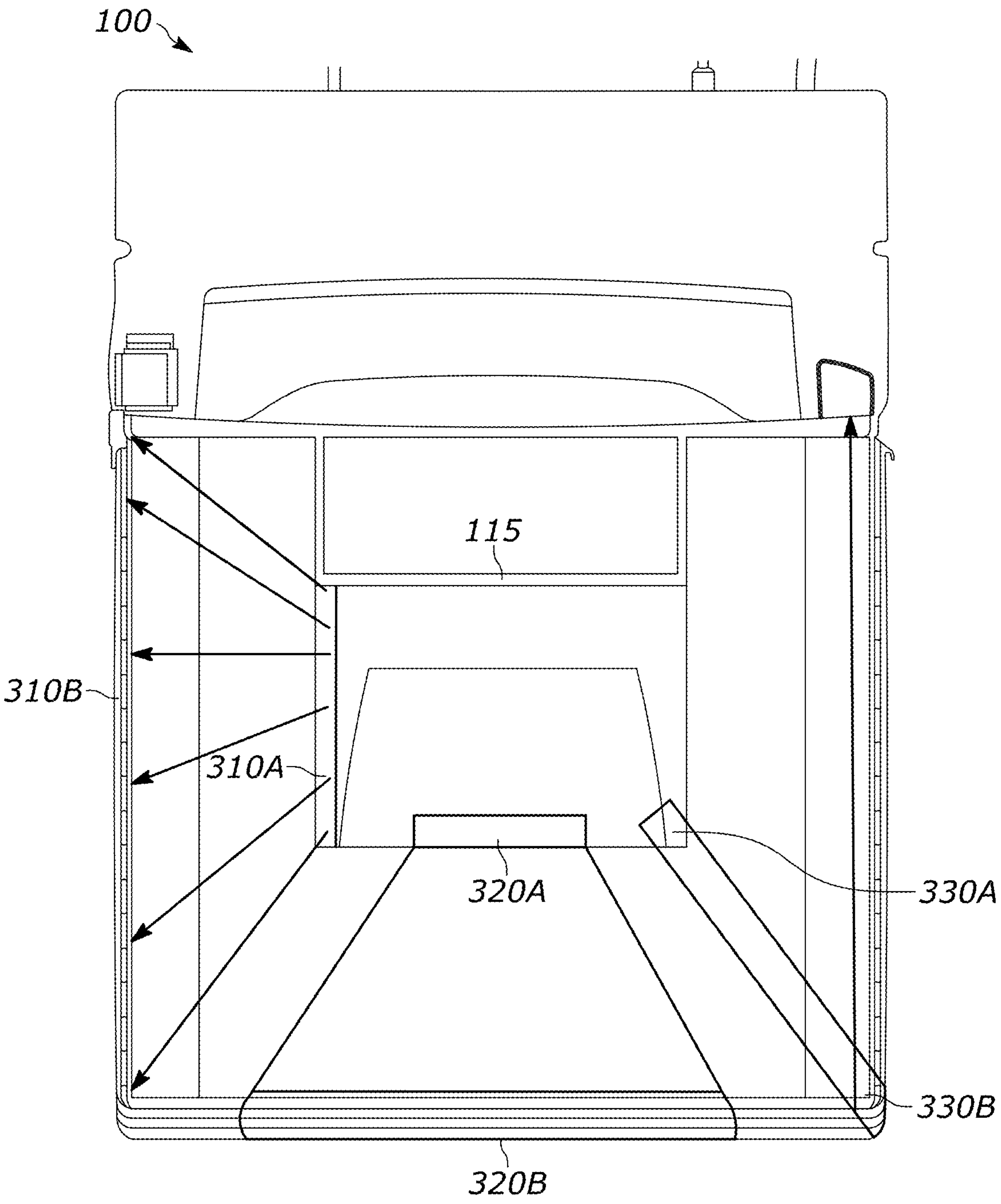
FIG. 1H illustrates a top-down view of the bi-optic barcode reader of FIG. 1A and various redirected FOVs according to redirection elements in the bi-optic barcode reader of FIG. 1A.

Similarly, FIG. 1E depicts an alternate embodiment where the redirection elements 302A and 302B redirect the FOV (e.g., FOV 305A of FIG. 1C) into redirected portions 305B and 305C, redirected laterally rather than vertically. FIG. 1F depicts another alternate embodiment where the redirection element 302B redirects the FOV (e.g., FOV 305A of FIG. 1C) to a corner of the platter 115 with a wider redirected portion 305F. The wider redirected portion 305F may be implemented in some systems to improve operations such as wakeup operations, as described below. Similarly, FIG. 1G depicts yet another alternate embodiment where the redirection element 302C redirects the FOV (e.g., FOV 305A of FIG. 1C) to a center portion of an edge of the platter 115. The center redirected portion 305G of the FOV covers a center portion of the platter 115, and may therefore provide many of the benefits of multiple redirection elements while using a single redirection element 302C.

In some implementations, the bi-optic reader 100 may determine whether an object is passing through the user-facing vision curtain of a redirection portion (e.g., redirection portion 320B, 305B, 305C, 305F, 305G, etc.) but not the main portion of the FOV 305 (e.g., portions 310A, 320A, 305A, etc.) to determine whether a user is attempting to perform a scan avoidance event, as discussed below with regard to FIG. 4.

Furthermore, the FOVs may detect an object 118 when passing through a redirection portion of the FOV, prior to the object 118 entering the main FOV 305A, allowing the bi-optic barcode reader 100 to perform a wakeup or similar operation. Moreover, the bi-optic barcode reader 100 may use the redirected portions (e.g., portions 305B, 305C, 305F, 305G, etc.) and/or the visual curtains (e.g., redirected portions 310B or 320B) to perform scan limiting and/or scan volume operations. For example, a user may only want to scan objects within a predetermined region (e.g., with the bounds of the platter 115) and may not want decode operations to occur for objects outside the predetermined region. As such, the bi-optic barcode reader may determine to only decode or transmit an image to a decode module for decoding when the bi-optic barcode reader detects an object 118 in the redirected portions (e.g., 305B, 305C, 305F, 305G, etc.) or the visual curtains of redirected portions (e.g., 310B or 320B) prior to or while detecting an object 118 in the main FOV 305A.

Depending on the implementation, the redirection element 302 may be or include a lightpipe with a total internal reflection (TIR) surface, one or more optical fibers for directing light, one or more mirrors for reflecting light, a waveguide capable of transmitting light within a degree of distortion, and/or any other such optical element or combination of elements. In further implementations, the redirection element 302 may be built into or otherwise part of the platter 115. The redirection element 302 may redirect the FOV 305 to another portion of the bi-optic barcode reader 100. The redirected portion 305B may depict portions of the environment that the FOV 305 does not normally depict and/or make some portions of the environment clearer for the bi-optic barcode reader 100.

In some implementations, the bi-optic barcode reader 100 redirects the FOV from various portions of a platter 115 to an outside portion associated with the platter 115 and/or the bi-optic barcode reader 100 as a whole. For example, in the exemplary embodiment of FIG. 1H, the bi-optic barcode reader 100 redirects an initial portion 310A, 320A, 330A of the FOV to an outside portion of the platter 115 as a vision curtain of redirected portion 310B, 320B or the redirected FOV of redirected portion 330B. In some implementations, the redirected FOV is or includes a vertical vision curtain to detect anything passing above the portion of the bi-optic barcode reader 100. In other implementations, the redirected FOV is a horizontal redirected FOV of redirected portion 330B, and depicts a view further out from the bi-optic barcode reader 100 (e.g., the user and/or a hand of the user). In still further implementations, the redirected FOV of redirected portion 330B is directed such that any object 118 passing over the bi-optic barcode reader 100 passes in front of the redirected FOV. In further implementations, the redirection elements may additionally or alternatively redirect light, as described in more detail herein.

In further implementations, the bi-optic reader may be configured such that the it perform slit-frame analysis on the images captured by the imaging assembly whereby the portion of the frame that is analyzed is a portion that corresponds to the redirected portion of the FOV. This could be particularly useful in wake-up implementations where only a portion of the FOV needs to be analyzed.

Although not shown in FIGS. 1A-1H, bi-optic barcode reader 100 can also include additional optical and electronic components, such as a vertical illumination printed circuit board, a user interface printed circuit board, a speaker, a color vision camera illumination printed circuit board, and an off-platter detection system printed circuit board.

Figure 2:
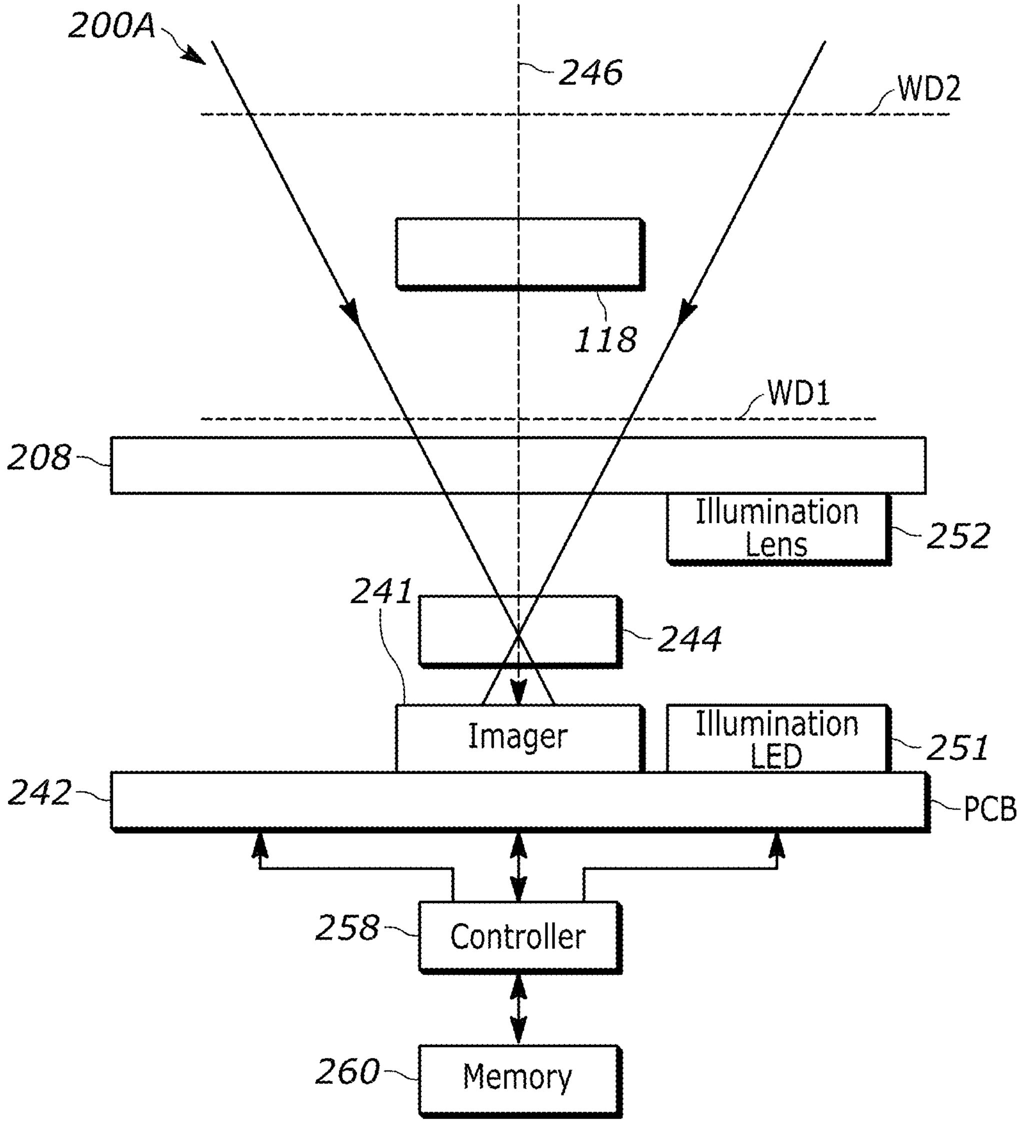
FIG. 2 illustrates a block diagram of an example imaging device such as the example bi-optic barcode reader of FIGS. 1A-1H.

Referring next to FIG. 2, a block diagram of an example architecture for an imaging device such as bi-optic barcode reader 100 is shown. For at least some of the reader embodiments, an imaging assembly includes a light-detecting sensor or imager 241 operatively coupled to, or mounted on, a printed circuit board (PCB) 242 in the imaging device 200 as shown in FIG. 2. In an embodiment, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 244 over a field of view along an imaging axis 246 through the window 208. The imager 241 may also include and/or function as a monochrome sensor and, in further implementations, a color sensor. It will be understood that, although imager 241 is depicted in FIG. 2 as a single block, that imager 241 may be multiple sensors spread out in different locations of imaging device 200.

In particular, the imager 241 captures an image of an environment including an object 118. Light (e.g., from the environment and/or from the illumination light source 251) impacts the object 118. The return light is scattered and/or reflected from an object 118 over the field of view. The imaging assembly 244 is operative for focusing the return light onto the array of image sensors to enable the object 118 to be read. In particular, the light that impinges on the pixels is sensed and the output of those pixels produce image data that is associated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an embodiment, WD1 is about one-half inch from the window 208, and WD2 is about thirty inches from the window 208.

An illuminating light assembly may also be mounted in the imaging device 200. The illuminating light assembly includes an illumination light source 251, such as at least one light emitting diode (LED) and at least one illumination lens 252, and one or more illumination sources and illumination lenses, configured to generate a substantially uniform distributed illumination pattern of illumination light on and along the object 118 to be read by image capture. Although FIG. 2 illustrates a single illumination light source 251 it will be understood that the illumination light source 251 may include additional light sources. At least part of the scattered and/or reflected return light is derived from the illumination pattern of light on and along the object 118. In some implementations, the illumination source 251 includes a light source that emits colored light (e.g., red light LED, green light LED, blue light LED, etc.) or substantially white light (e.g., a white light LED). In further implementations, the illumination source 251 includes a plurality of light sources that collectively emit colored light, substantially white light, or light that, in combination, appears white or of a particular color to the human eye. For example, the illumination source 251 may include a red LED, a blue LED, and a green LED that emit light in combination to appear white to the human eye.

Further, the imager 241 and the illumination source 251 are operatively connected to a controller or programmed microprocessor 258 operative for controlling the operation of these components. A memory 260 is connected and accessible to the controller 258. Preferably, the microprocessor 258 is the same as the one used for processing the captured return light from the illuminated object 118 to obtain data related to the object 118. Though not shown, additional optical elements, such as collimators, lenses, apertures, compartment walls, etc. are provided in the housing. Although FIG. 2 shows the imager 241 and the illumination source 251 as being mounted on the same PCB 242, it should be understood that different embodiments of the imaging device 200 may have these components each on a separate PCB, or in different combinations on separate PCBs. For example, in an embodiment of the imaging device 200, the illumination LED source is provided as an off-axis illumination (i.e., has a central illumination axis that is not parallel to the central FOV axis).

In some implementations, the object 118 is or includes an indicia for decoding, such as a barcode, a QR code, a label, etc. In further implementations, the object 118 is or includes a digital watermark, the digital watermark may include a plurality of repeating barcodes, product codes, code patterns, or other such indicia that comprise the digital watermark. In some such implementations, the digital watermark is invisible or near-invisible to the human eye but is able to be detected and/or imaged by an imaging device 200.

Although FIGS. 1A-1H depict an imaging device such as a bi-optic barcode reader 100 in the form of a particular barcode reading platform, it will be understood that further imaging devices may include architecture similar to imaging device 200 and/or bi-optic barcode reader 100.

Figure 3:
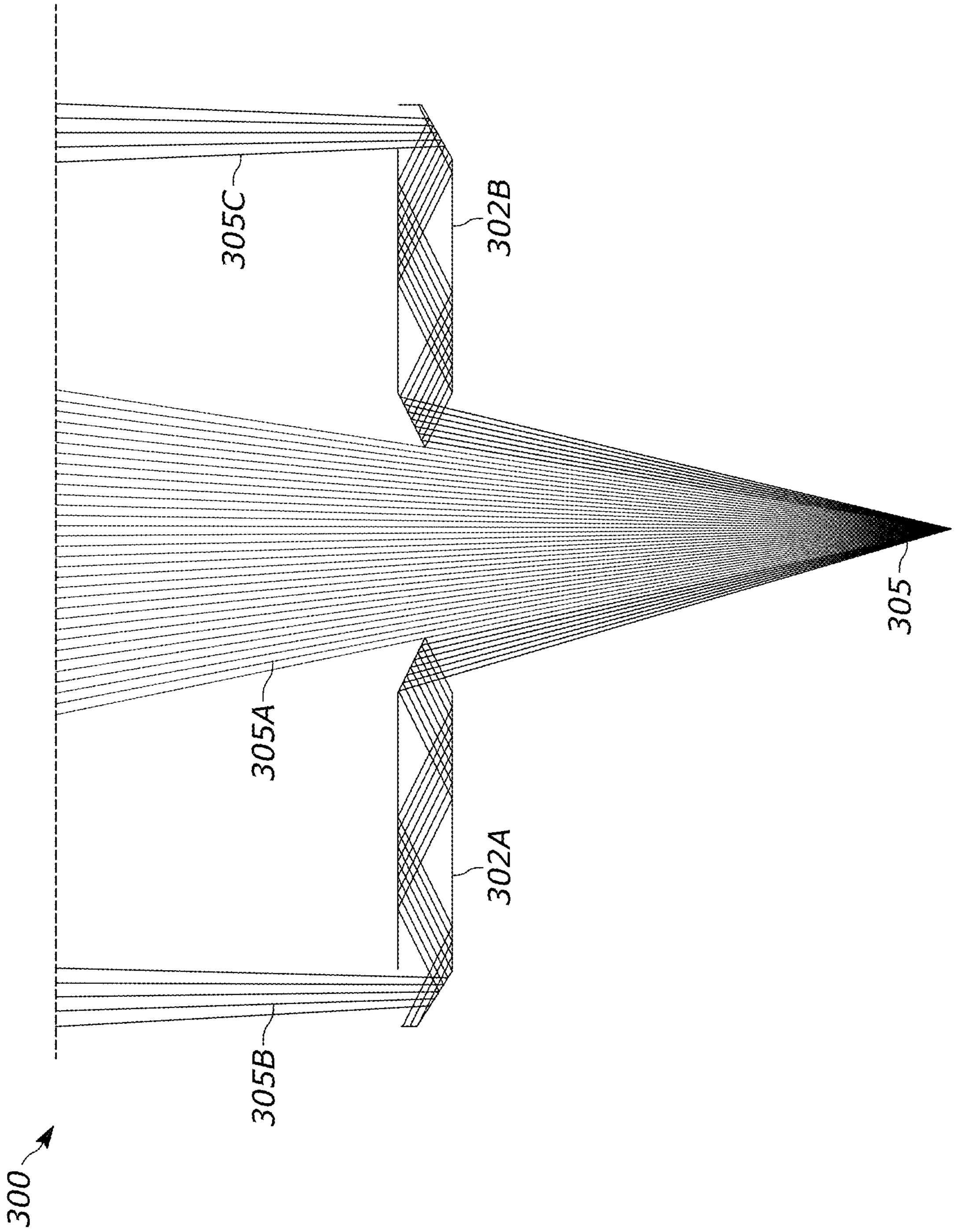
FIG. 3 illustrates an example redirection assembly redirecting portions of a FOV and/or illumination in the example bi-optic barcode reader or imaging device of FIGS. 1A-2.

Referring to FIG. 3, a block diagram cross-section of an example platter 300 is illustrated. The example platter 300 may include one or more redirection elements 302. In some implementations, the platter 300 may include a single redirection element 302 for redirecting an FOV associated with an imaging device (e.g., bi-optic barcode reader 100 or imaging device 200 as described above with regard to FIGS. 1A-2). In other implementations, the platter 300 may include a first redirection element 302A and a second redirection element for redirecting multiple portions of the FOV. In particular, each portion of the FOV may be redirected to a different area of the FOV (e.g., to a left side and a right side of the outer portion of the FOV, to each side of the outer portion of the FOV, etc.). In still other implementations, the platter 300 includes a first redirection element 302A for redirecting a portion of the FOV and a second redirection element 302B for redirecting a portion of light being transmit from an illumination device (e.g., illumination light source 251).

Each redirection element 302 redirects at least a portion of the FOV 305 such that a remaining portion 305A of the FOV remains unaltered, and redirected portions 305B and/or 305C are redirected to allow the FOV to include other portions of an environment. Depending on the implementation the platter 300 redirects the FOV to an outside portion of a platter (e.g., platter 115), to a center portion of the platter 115, to a horizontal position above the platter 115, to an angled position at a relative bottom of the platter 115 (e.g., an end closest to a user during operation), to a landmark of the imaging device or platter 115, outside the platter 115, etc. Depending on the implementation, the redirection elements 302 may redirect the FOV to be horizontal, vertical, angled, etc. Similarly, the redirection elements 302 may additionally or alternatively redirect light to the same location or to different locations, as described below.

Figure 4:
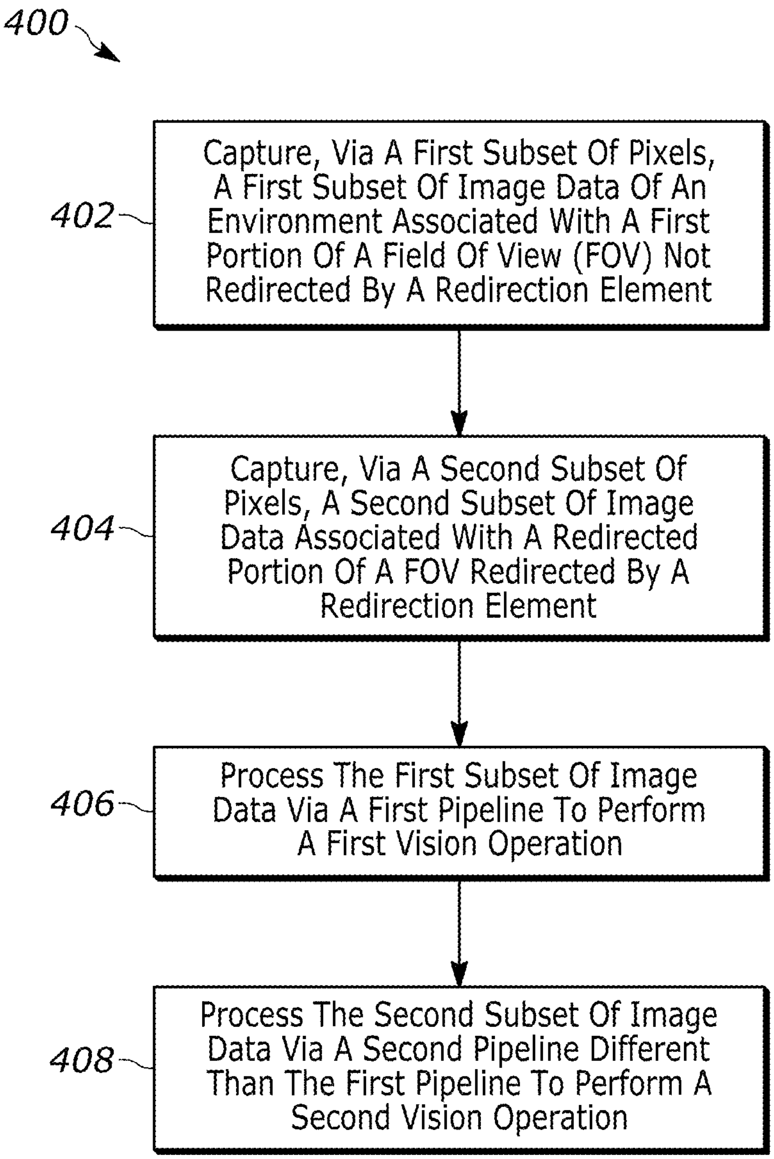
FIG. 4 illustrates a flow diagram of an example method for redirecting and/or repurposing portions of a FOV and/or illumination in the FOV using a bi-optic barcode reader or imaging device of FIGS. 1A-2.

Referring next to FIG. 4, the method 400 illustrates a flow diagram of an example method for generating, analyzing, and performing a series of job tasks in an industrial imager. Although the method 700 is described below with regard to imaging device 200 and components thereof as illustrated in FIG. 2, it will be understood that other similarly suitable imaging devices and components may be used instead.

At block 402, the imaging device 200 captures a first subset of image data of an environment appearing in a field of view (FOV) for an imaging assembly (e.g., imager 241). The first subset of image data is associated with a first portion of the FOV that is not redirected by a redirection element (e.g., redirection element 302).

At block 404, the imaging device 200 captures, via a second subset of pixels, a second subset of image data associated with a redirected portion of a FOV redirected by a redirection element. Depending on the implementation, the imaging device 200 is configured such that enough pixels are in the second subset so as to tolerate a pointing error (e.g., due to positioning of a redirection element, due to small particles, due to shifts in position of a platter, etc.). Depending on the implementation, the second subset includes more than 10 pixels, more than 15 pixels, more than 25 pixels, etc. In some implementations, the second subset of pixels are pixels that are unlikely to normally be used to detect an object. For example, the imaging device 200 may redirect a portion of the FOV near the base (e.g., a bottom edge) of a vertical window of the device (e.g., window 125 or 208) or directly in front of the window 125 or 208.

In some implementations, the imaging device 200 redirects the pixels to an outer portion (e.g., as described above with regard to FIGS. 1A-1H) of a platter (e.g., platter 115) using a redirection element (e.g., redirection element 302). In further implementations, the imaging device 200 redirects the FOV to a center portion of the platter 115, to a horizontal position above the platter 115, to an angled position at a relative bottom of the platter 115 (e.g., an end closest to a user during operation), to a landmark of the imaging device 200, outside the platter 115, etc. Depending on the implementation, the redirection element 302 may redirect the FOV to be horizontal, vertical, angled, etc. Further, the redirection element 302 may be or include a lightpipe with a total internal reflection (TIR) surface, one or more optical fibers for directing light, one or more mirrors for reflecting light, and/or any other such optical element or combination of elements. In still further implementations, the redirection element may be another optical element for directing light with some level of distortion to maintain a wavefront corresponding to the FOV during transmission.

In some implementations, the imaging device 200 additionally redirects light from an illumination device (e.g., illumination light source 251) via a redirection element. Depending on the implementation, the imaging device 200 may redirect the light using the same redirection element (e.g., redirection element 302A) or by using a second redirection element (e.g., redirection element 302B). In implementations in which the imaging device 200 uses a second redirection element to redirect the light from the illumination light source 251, the imaging device 200 may illuminate the redirected portion of the FOV (e.g., by redirecting the light to the outer portion of the FOV), the non-redirected portion of the FOV, an area outside the FOV, and/or any other such area as appropriate for performing various scanning and/or machine vision operations as described herein. In implementations in which the imaging device 200 redirects the light using the same redirection element, the imaging device 200 illuminates at least the redirected portion of the FOV.

In further implementations, the imaging device 200 includes a photodetector element. In some such implementations, the redirection element 302B redirects the light from the illumination source 251 such that the light impacts the photodetector. In such implementations, the photodetector may indicate to a controller 258 of the imaging device 200 that an object is present and when the photodetector does not detect light (e.g., the imaging device 200 determines that an object is blocking the light). In still further implementations, the imaging device 200 (e.g., via a redirection element 302A, 302B, etc.) redirects the FOV to a first corner of the outer area of the platter and redirects the light to a second corner (e.g., along a same edge of the outer area as the first corner). The imaging device 200 may then detect whether an object is overhanging an edge of the platter connecting the first corner and the second corner by determining whether the illumination is obscured. In response, the imaging device 200 then determines whether an off-platter event is occurring (e.g., a user is attempting to move an object outside of the non-redirected FOV) based on whether the illumination is obscured.

In still further implementations, the imaging device 200 includes one or more secondary imagers (not shown) without an illumination source. As such, the imaging device 200 may include additional or alternate redirection elements to redirect light to the secondary imagers, allowing for more compact and/or efficient secondary imagers to be used without additional sources of illumination.

At block 406, the imaging device 200 processes the first subset of image data via a first pipeline (e.g., a series of modules, programs, algorithms, etc.) to perform a first vision operation using the image data. Depending on the implementation, the first vision operation may be or include at least one of (i) transmitting the image data to a decoder (e.g., for a decode operation) and/or (ii) transmitting the image data to a vision analysis module (e.g., for one or more machine vision operations). Depending on the implementation, the machine vision operation(s) may be or include a motion detection event, a scan avoidance event, a sweethearting event, a theft detection event, an off-platter detection etc.

At block 408, the imaging device 200 processes the second subset of image data via a second pipeline to perform a second vision operation based on the redirected portion of the FOV. In some implementations, the second pipeline is different than the first pipeline. Similarly, depending on the implementation, the second vision operation may be the same operation as the first vision operation (e.g., two decode operation) or a different operation (e.g., a decode operation and a machine vision operation). In further implementations, the second vision operation is associated with at least one of (i) a wakeup operation, (ii) a scan avoidance operation, (iii) an object detection operation, (iv) an off-platter detection operation, and/or (v) any other such operation or combination of operations as generally described herein.

In implementations in which the second vision operations include a scan avoidance operation, the imaging device 200 may initiate the scan avoidance operation upon detecting an object in the redirected portion of the FOV. The imaging device 200 may then determine that the object is not visible in the first portion of the FOV (e.g., an inner portion of the platter 115) not redirected by the redirection element 302, and, in response, determines that a user is attempting to avoid a scan for the object. In particular, a user may attempt to avoid a scan by moving an object near a bottom of the plate (e.g., near the user). As such, the user appears to be scanning an object to an observer while the imaging device is unable to detect the object. By determining that an object is visible a redirected portion of the FOV but not in the first portion of the FOV, the imaging device 200 may detect such attempts at scan avoidance. In further implementations, the imaging device 200 detects an arm in the redirected portion of the FOV to indicate that an object should be detected in the non-redirected portion of the FOV not redirected by the redirection element 302. In still further implementations, the imaging device 200 detects when both corners of the FOV are crossed to prevent a user from reaching around with an arm to pull the object across.

Depending on the implementation, the imaging device 200 includes multiple redirection elements to redirect multiple portions of the FOV. For example, the imaging device 200 may redirect portions of the FOV to two or three of the free sides of an outer portion of a platter 115. In further implementations, the imaging device 200 redirects a portion of the FOV to generate a vision curtain rising vertically from a portion of the platter or moving horizontally over a portion of the platter. In still further implementations, the imaging device 200 performs a third vision operation according to the second redirected portion of the FOV. Depending on the implementation, the third vision operation may be similar to or different from the first vision operation and/or the second vision operation. In further implementations, the imaging device 200 performs the second vision operation using multiple redirected portions of the FOV rather than a third vision operation. In still further implementations, the imaging device 200 may use the first redirected portion of the FOV and/or the second redirected portion of the FOV for the second vision operation and/or the third vision operation.

In further implementations, the imaging device 200 may operate in a slit frame mode such that the imaging device 200 monitors a subset of the plurality of pixels for an indication to perform a wakeup operation. In some such implementations, at least some pixels of the plurality of pixels are the second subset of pixels. As such, the imaging device 200 may monitor only some of the pixels for a wakeup operation to save power. Similarly, the imaging device 200 may, depending on the implementation, increase a frame rate of at least some of the pixels (e.g., the second subset of pixels, the pixels being monitored, etc.) while decreasing the framerate or leaving the framerate at a normal operation level for a remainder of the pixels to improve responsiveness while reducing and/or minimizing power drain.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging system, comprising:

an imaging assembly configured to capture image data of an environment appearing in a field of view (FOV) via a plurality of pixels; and a platter including a window and a redirection element disposed within a path of a portion of the FOV such that the redirection element redirects the portion of the FOV to pass through the platter to a portion of the platter separate from the window.

2. The imaging system of claim 1, wherein the image data received through the redirection element is used for at least one of: (i) a wakeup operation, (ii) a scan avoidance operation, (iii) an object detection operation, or (iv) an off-platter detection operation.

3. The imaging system of claim 2, wherein the image data received through the redirection element is used for the scan avoidance operation, and the scan avoidance operation includes:

detecting an object in the redirected portion of the FOV;

determining that the object is not visible in a portion of the FOV that is separate from the redirected portion of the FOV; and in response, determining that a user is attempting to avoid a scan for the object.

4. The imaging system of claim 1, wherein the redirection element is a first redirection element, and the imaging system further comprises:

an illumination system configured to project light that illuminates at least an illuminated portion of the FOV; and wherein the platter includes a second redirection element disposed within a path of the illuminated portion of the FOV such that the second redirection element redirects a portion of the light to pass through the platter.

5. The imaging system of claim 4, wherein the second redirection element illuminates the redirected portion of the FOV by redirecting the portion of the light to the portion of the platter.

6. The imaging system of claim 4, wherein the imaging system includes a photodetector disposed to receive the portion of the light from the second redirection element, and a computer-readable media that stores instructions that, when executed, cause the imaging system to determine that an object is present when the photodetector does not detect light.

7. The imaging system of claim 4, wherein the second redirection element redirects the portion of the light to a first corner of an outer area, the redirected portion of the FOV includes a second corner of an outer area, and the computer-readable media further stores additional instructions that, when executed, cause the imaging system to:

detect whether an object is overhanging an edge of the platter connecting the first corner and the second corner by determining whether the illumination is obscured; and in response, determine whether an off-platter event is occurring based on whether the illumination is obscured.

8. The imaging system of claim 1, wherein the imaging system further comprises:

an illumination system configured to project light that illuminates at least an illuminated portion of the FOV; and wherein the redirection element is further disposed within a path of the illuminated portion of the FOV such that the redirection element illuminates the redirected portion of the FOV by redirecting a portion of the light to pass through the platter.

9. The imaging system of claim 1, wherein the redirection element is a first redirection element, the redirected portion is a first redirected portion, the portion of the platter is a first portion of the platter, and the platter further comprises:

a second redirection element disposed within a path of a second portion of the FOV, such that the second redirection element redirects the second portion of the FOV to pass through the platter to a second portion of the platter.

10. The imaging system of claim 1, wherein the redirection element includes at least one of: (i) a lightpipe with a total internal reflection (TIR) surface; (ii) one or more optical fibers for directing light; or (iii) one or more mirrors for reflecting light.

11. The imaging system of claim 1, wherein the redirection element redirects the redirected portion of the FOV by redirecting the portion of the FOV to the portion of the platter such that the redirected portion of the FOV aligns with an outside edge of the platter and is directed upwards from the platter.

* * * * *